US007102823B2

(12) United States Patent
Schilling et al.

(10) Patent No.: US 7,102,823 B2
(45) Date of Patent: Sep. 5, 2006

(54) DIFFRACTIVE SECURITY ELEMENT HAVING AN INTEGRATED OPTICAL WAVEGUIDE

(75) Inventors: Andreas Schilling, Hagendorn (CH); Wayne Robert Tompkin, Baden (CH); René Staub, Hagendorn (CH)

(73) Assignee: OVD Kinegram AG, 5301 Zug (CH)

( * ) Notice: Subject to any disclaimer, the term of this patent is extended or adjusted under 35 U.S.C. 154(b) by 204 days.

(21) Appl. No.: 10/501,586

(22) PCT Filed: Nov. 2, 2002

(86) PCT No.: PCT/EP02/12243

§ 371 (c)(1), (2), (4) Date: Sep. 10, 2004

(87) PCT Pub. No.: WO03/059643

PCT Pub. Date: Jul. 24, 2003

(65) Prior Publication Data

US 2005/0128590 A1 Jun. 16, 2005

(30) Foreign Application Priority Data

Jan. 18, 2002 (CH) .................................... 0084/02

(51) Int. Cl.
*G02B 5/18* (2006.01)

(52) U.S. Cl. ...................... 359/566; 359/569; 359/572; 359/2; 359/576; 283/94

(58) Field of Classification Search ................ 359/566, 359/569, 572, 2, 576, 573
See application file for complete search history.

(56) References Cited

U.S. PATENT DOCUMENTS

| | | | | |
|---|---|---|---|---|
| 4,426,130 | A | 1/1984 | Knop | |
| 4,484,797 | A * | 11/1984 | Knop et al. | 359/568 |
| 4,856,857 | A | 8/1989 | Takeuchi et al. | |
| 4,892,385 | A * | 1/1990 | Webster et al. | 359/572 |
| 5,886,798 | A * | 3/1999 | Staub et al. | 359/2 |

FOREIGN PATENT DOCUMENTS

DE 3308831 A1 5/1984

(Continued)

OTHER PUBLICATIONS

Rudolf L. van Renesse, "Optical Document Security", Second Edition, pp. 274-287, Artech House, 1998.

*Primary Examiner*—Fayez G. Assaf
(74) *Attorney, Agent, or Firm*—Hoffmann & Baron, LLP

(57) ABSTRACT

A diffractive security element (2) is divided into surface portions, having an optically effective structure (9) at interfaces embedded between two layers of a layer composite (1) of plastic material. At least the base layer (4), which is to be illuminated, of the layer composite (1) is transparent. The optically effective structure (9) as a base structure has a zero order diffraction grating with a period length of at most 500 nm. In at least one of the surface portions an integrated optical waveguide (5) with a layer thickness (s) of a transparent dielectric is embedded between the base layer (4) and an adhesive layer (7) of the layer composite (1) and/or a protective layer (6) of the layer composite (1), wherein the profile depth of the optically effective structure (9) is in a predetermined relationship with the layer thickness (s). Upon illumination with white incident light (13) the security element (2) produces light (14) which is diffracted in the zero diffraction order, of high intensity and with an intensive color.

15 Claims, 2 Drawing Sheets

FOREIGN PATENT DOCUMENTS

| | | | |
|---|---|---|---|
| EP | 0 105 099 | | 4/1984 |
| EP | 0 375 833 | | 7/1990 |
| EP | 0 534 795 | A2 | 3/1993 |
| EP | 0 895 100 | A2 | 2/1999 |
| WO | WO 83/00395 | | 2/1983 |
| WO | WO 99/47983 | | 9/1999 |

* cited by examiner

DIFFRACTIVE SECURITY ELEMENT HAVING AN INTEGRATED OPTICAL WAVEGUIDE

This application claims priority based on PCT Application No. PCT/EP02/12243, filed on Nov. 2, 2002 and Swiss Patent Application No. 0084/02, filed on Jan. 18, 2002, both of which are incorporated herein by reference in their entirety.

BACKGROUND OF THE INVENTION

The invention relates to a diffractive security element which is divided into surface portions with an optically effective structure of interfaces embedded between two layers of a composite of plastic material.

Diffractive security elements of that kind are used for the verification of articles such as banknotes, passes and identity cards of all kinds, valuable documents and so forth in order to be able to establish the authenticity of the article without involving a high level of cost. When the article is issued the diffractive security element is fixedly joined thereto, in the form of a stamp portion cut from a thin layer composite.

Diffractive security elements of the kind set forth in the opening part of this specification are known from EP 0 105 099 A1 and EP 0 375 833 A1. Those security elements include a pattern of surface elements which are arranged in a mosaic-like fashion and which have a diffraction grating. The diffraction gratings are azimuthally predetermined in such a way that, upon a rotary movement, the visible pattern produced by diffracted light performs a predetermined sequence of movements.

U.S. Pat. No. 4,856,857 describes the structure of transparent security elements with impressed microscopically fine relief structures. Those diffractive security elements generally comprise a portion of a thin layer composite of plastic material. The interface between two of the layers has microscopically fine reliefs of light-diffracting structures. To enhance reflectivity the interface between the two layers is covered with a mostly metallic reflection layer. The structure of the thin layer composite and the materials which can be used for that purpose are described for example in U.S. Pat. No. 4,856,857 and WO 99/47983. It is known from DE 33 08 831 A1 for the thin layer composite to be applied to an article by means of a carrier film.

The disadvantage of the known diffractive security elements lies in the difficulty of visually recognising complicated, optically varying patterns in a narrow solid angle and the extremely high level of surface brightness, at which a surface element occupied by a diffraction grating is visible to an observer. The high level of surface brightness can also make it difficult to recognise the shape of the surface element.

A security element which is simple to recognise is known from WO 83/00395. It comprises a diffractive subtractive color filter which, upon illumination with for example daylight, in a viewing direction, reflects red light and, after rotation of the security element in the plane thereof through 90°, reflects light of another color. The security element comprises fine bars, embedded in plastic material, the bars being of a transparent dielectric with a refractive index which is much greater than that of the plastic material. The bars form a grating structure with a spatial frequency of 2500 lines/mm and reflect in the zero diffraction order red light with a very high level of efficiency if the white light incident on the bar structure is polarised in such a way that the E-vector of the incident light is oriented in parallel relationship with the bars. For spatial frequencies of 3100 lines/mm the bar structure reflects green light in the zero diffraction order, while for even higher spatial frequencies the reflected color goes into the blue range in the spectrum. According to van Renesse, Optical Document Security, 2nd Edition, pages 274–277, ISBN 0-89006-982-4, such structures are difficult to produce inexpensively in large amounts.

U.S. Pat. No. 4,426,130 describes transparent, reflecting sinusoidal phase grating structures. The phase grating structures are so designed that they have the highest possible level of diffraction efficiency in one of the two first diffraction orders.

SUMMARY OF THE INVENTION

The object of the present invention is to provide an inexpensive diffractive security element which is simple to recognise and which in daylight can be easily visually checked.

The specified object is attained in accordance with the invention by the features recited in the characterising portion of claim 1. Advantageous configurations of the invention are set forth in the appendant claims.

BRIEF DESCRIPTION OF THE DRAWINGS

Embodiments by way of example of the invention are described in greater detail hereinafter and are illustrated in the drawing in which.

DESCRIPTION OF THE PREFERRED EMBODIMENTS

Figure 1:
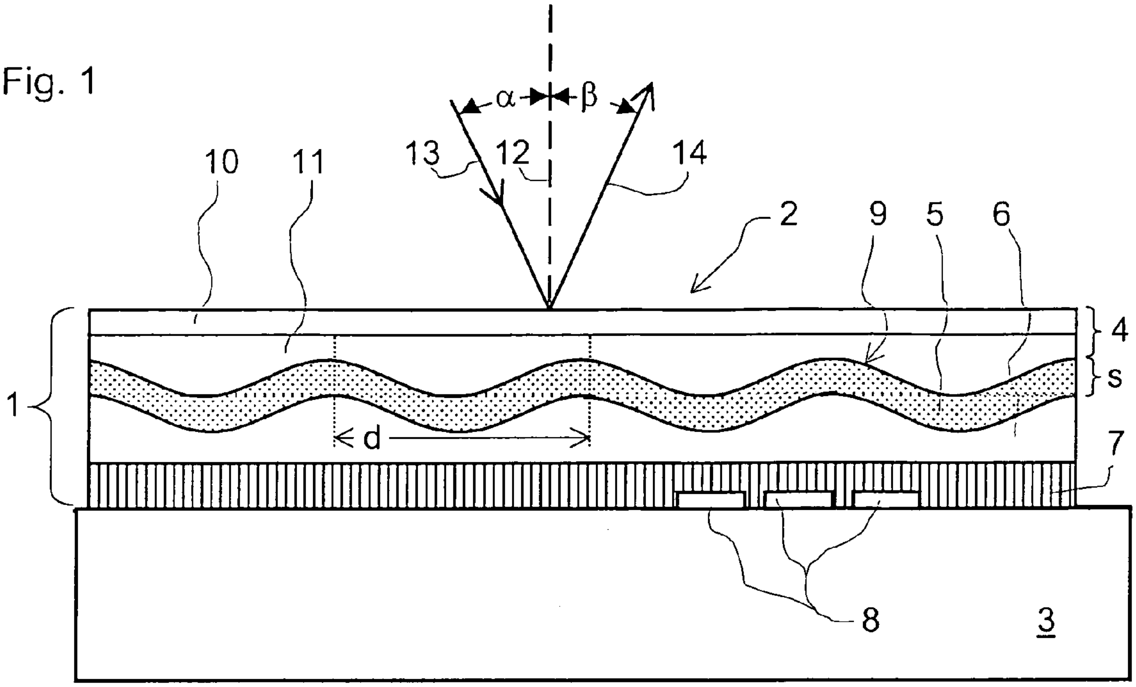
FIG. 1 is a view in cross-section of a security element.

In FIG. 1 reference 1 denotes a layer composite, 2 a security element, 3 a substrate, 4 a base layer, 5 an optical waveguide, 6 a protective layer, 7 an adhesive layer, 8 indicia and 9 an optically effective structure at the interface between the base layer 4 and the waveguide 5. The layer composite 1 comprises a plurality of layer portions of various dielectric layers which are applied successively to a carrier film (not shown here) and in the specified sequence includes at least the base layer 4, the waveguide 5, the protective layer 6 and the adhesive layer 7. For particularly thin layer composites 1 the protective layer 6 and the adhesive layer 7 comprise the same material, for example a hot melt adhesive. In an embodiment the carrier film is part of the base layer 4 and forms a stabilisation layer 10 for a shaping layer 11 arranged on the surface of the stabilisation layer 10, which faces towards the waveguide 5. The join between the stabilisation layer 10 and the shaping layer 11 has a very high level of adhesive strength. In another embodiment a separating layer (not shown here) is arranged between the base layer 4 and the carrier film as the carrier film only serves for applying the thin layer composite 1 to the substrate 3 and is thereafter removed from the layer composite 1. The stabilisation layer 10 is for example a scratch-resistant lacquer for protecting the softer shaping layer 11. This configuration of the layer composite 1 is described in above-mentioned DE 33 08 831 A1. The base layer 4, the waveguide 5, the protective layer 6 and the adhesive layer 7 are transparent but preferably crystal-clear at least for a part of the visible spectrum. Therefore the indicia 8 which are possibly covered on the substrate by the layer composite 1 are visible through the layer composite 1.

In another embodiment of the security element in which transparency is not required the protective layer 6 and/or the adhesive layer 7 is colored or black. A further configuration of the security element only has the protective layer 6 if that embodiment is not intended for being stuck on.

The layer composite 1 is produced for example in the form of a plastic laminate in the form of a long film web with a plurality of mutually juxtaposed copies of the security element 2. The security elements 2 are for example cut out of the film web and joined to the substrate 3 by means of the adhesive layer 7. The substrate 3, mostly in the form of a document, a banknote, a bank card, a pass or identity card or another important or valuable article, is provided with the security element 2 in order to verify the authenticity of the article.

So that the waveguide 5 is optically effective the waveguide 5 comprises a transparent dielectric, the refractive index of which is considerably higher than those of the plastic materials for the base layer 4, the protective layer 6 and the adhesive layer 7. Suitable dielectric materials are set out for example in above-mentioned specifications WO 99/47983 and U.S. Pat. No. 4,856,857, Tables 1 and 6. Preferred dielectrics are ZnS, $TiO_2$ and so forth with refractive indices of $n \approx 2.3$.

The waveguide 5 fits closely to the interface relative to the shaping layer 11, which has the optically effective structure 9, and is therefore modulated with the optically effective structure 9. The optically effective structure 9 is a diffraction grating with such a high spatial frequency f that the light incident 13 at an angle of incidence $\alpha$ relative to the surface normal 12 of the security element 2 is diffracted by the security element 2 only into the zero diffraction order and the diffracted light 14 is reflected at the angle of reflection $\beta$, wherein: angle of incidence $\alpha$=angle of reflection $\beta$. This establishes for the spatial frequency f a lower limit of about 2200 lines/mm and an upper limit for a period length d of 450 nm. Those diffraction gratings are referred to as 'zero order diffraction gratings' and are meant by 'diffraction grating'. In the drawing in FIG. 1 by way of example the diffraction grating is of a sinusoidal profile but other known profiles can also be used.

The waveguide 5 begins to perform its function, that is to say to influence the reflected light 14, if the waveguide 5 includes between at least 10 and 20 periods of the optically effective structure 9 and therefore has a minimum length L, dependent on the period length d, of L>10d. Preferably the lower limit of the length L of the waveguide 5 is in the range of between 50 and 100 period lengths d so that the waveguide 5 affords its optimum effectiveness.

In an embodiment the security element 2, over its entire area, has a uniform diffraction grating for the optically effective structure 9 and a waveguide 5 of uniform layer thickness s. In another embodiment surface portions arranged in a mosaic configuration form an optically easily recognisable pattern. So that a surface portion of the mosaic can be recognised by an observer using the naked eye, in its contours, the dimensions are to be selected to be larger than 0.3 mm, that is to say at any event the waveguide 5 is of a sufficient minimum length L.

The security element 2 which is illuminated with white diffuse incident light 13 changes the color of the reflected diffracted light 14 if its orientation relative to the viewing direction is altered by means of a tilting or rotary movement. The axis of rotation of the rotary movement is the surface normal 12 while the tilting movement takes place about an axis of rotation which is in the plane of the security element 2.

Figure 2:
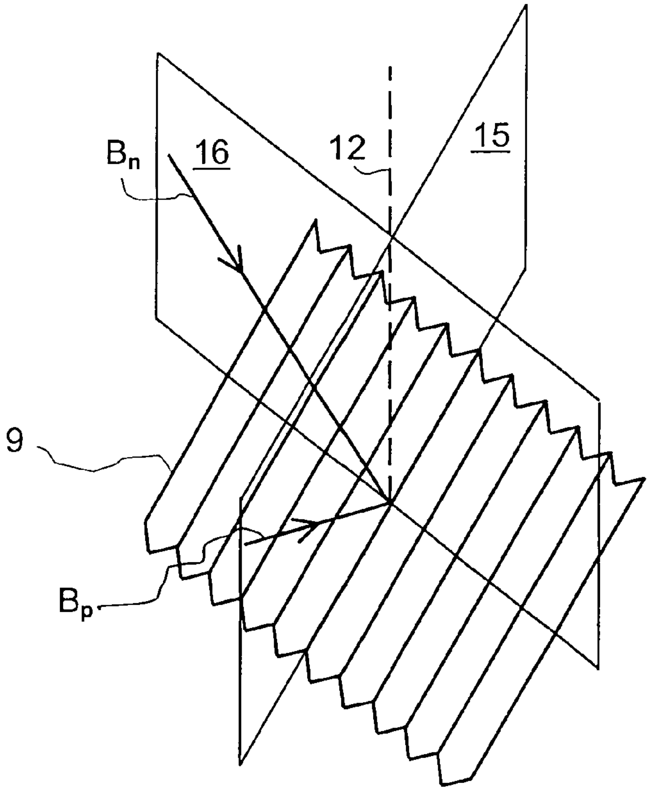
FIG. 2 shows diffraction planes and diffraction gratings.

The zero order diffraction gratings exhibit a pronounced behaviour in relation to polarised light 13, which is dependent on the azimuthal orientation of the diffraction grating. For describing the optical properties involved, in FIG. 2 diffraction planes 15, 16 are defined parallel and transversely with respect to the grating lines, wherein the diffraction planes 15, 16 additionally include the surface normal 12 on to the security element 2 (FIG. 1). The designations of light beams $B_p$, $B_n$ of the incident light 13 (FIG. 1) and directions of polarisation of the incident light 13 are to be established as follows:

- a subscript 'p' designates the light beam $B_p$ which is incident parallel to grating lines while a subscript 'n' designates the light beam $B_n$ which is incident perpendicularly to the grating lines;
- a subscript 'TE' in relation to the light beam $B_p$, $B_n$ denotes polarisation of the electrical field perpendicularly to the corresponding diffraction plane 15 and 16 respectively and
- a subscript 'TM' refers to polarisation of the electrical field in the corresponding diffraction plane 15 and 16 respectively.

For example the light beam $B_{nTM}$ is incident in the diffraction plane 16 perpendicularly on to the grating lines of the security element 2, with polarisation of the electrical field in the diffraction plane 16.

Depending on the respective parameters of the optically effective structure 9 and the waveguide 5 (FIG. 1), the respective embodiments of the security element 2 involve differing optical behaviour. Embodiments of that nature are described in the examples hereinafter which do not constitute a conclusive listing.

EXAMPLE 1

Change of Color Upon Rotation

Figure 3:
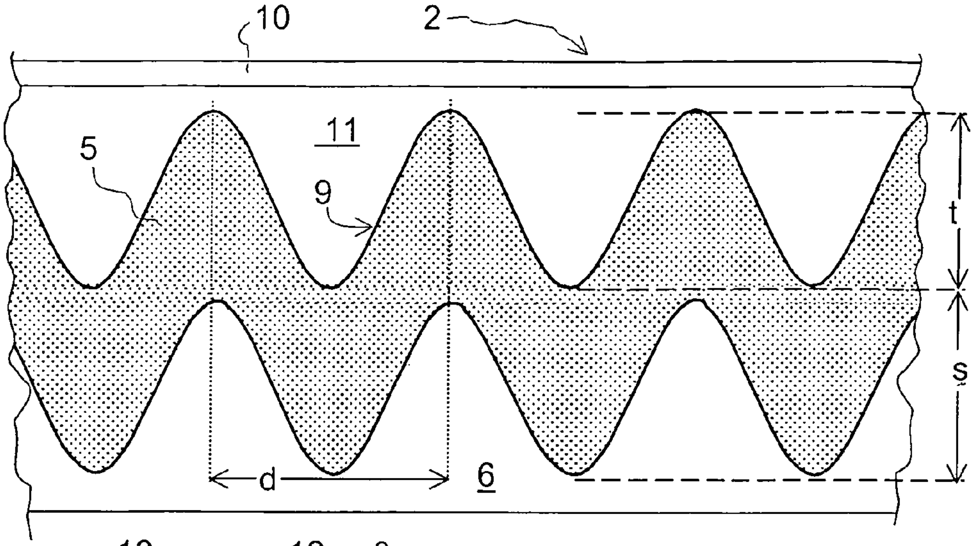
FIG. 3 shows a portion from FIG. 1 on an enlarged scale.

FIG. 3 shows the waveguide 5 in cross-section on an enlarged scale. The plastic layers, the stabilisation layer 10, the shaping layer 11, the protective layer 6 and the adhesive layer 7 (FIG. 1), in accordance with Table 6 of U.S. Pat. No. 4,856,857, have refractive indices $n_1$ in the range of between 1.5 and 1.6. The dielectric which is transparent for visible light 13 (FIG. 1), with the refractive index $n_2$, is deposited uniformly in a layer thickness d on the optically effective structure 9 formed in the shaping layer 11, so that on the interface towards the protective layer 6 the surface of the waveguide 5 also has the optically effective structure 9. The dielectric is an inorganic compound as mentioned for example in U.S. Pat. No. 4,856,857, Table 1 and in WO 99/47983, and is of a value in respect of the refractive index $n_2$ of at least $n_2$=2.

In an embodiment of the security element 2 the values for the profile depth t of the optically effective structure 6 and the layer thickness s are approximately equal: that is to say $s \approx t$, the waveguide 5 being modulated with the period d=370 nm. Preferably the layer thickness is $s \cong t = 75 \pm 3$ nm. If the light beam $B_{nTE}$ incident in the one diffraction plane 16 (FIG. 2) is incident on the security element 2 at an angle of incidence $\alpha$=25°, the security element 2 reflects the diffracted light 14 (FIG. 1) as a green color. Light 14 is reflected from the orthogonally polarised light beam $B_{nTM}$ only in the infrared, invisible part of the spectrum. The light beam $B_{pTM}$ which is incident in the other diffraction plane 15 at the same angle of incidence $\alpha$=25° leaves the security element 2 as diffracted light 14 of a red color while the diffracted light 14 produced by the light beam $B_{pTE}$ is of an orange mixed color of a level of intensity which is weak in comparison with the reflected light 14 of the light beam $B_{pTM}$. The color of the security element 2 changes upon illumination with white, unpolarisedly incident light 13 from the point of view of an observer from green to red upon rotary movement of the security element 2 through 90°. Tilting the security element 2 in the range of $\alpha$=25°±5° only immaterially changes the color; the change can scarcely be observed with the naked eye. In the rotary angle range 0°±20° only the red $B_{pTM}$ reflection is visible while in the rotary angle range 90°±20° only the green $B_{nTE}$ reflection is visible. In the intermediate range between 20° and 70° there is a mixed color comprising two adjacent spectral ranges, one for the component of $B_{nTE}$ and the other for the component of $B_{pTM}$.

That behaviour on the part of the security element 2 does not change substantially, except for slight color shifts, if the layer thickness of the waveguide 5 is varied between 65 nm and 85 nm and the profile depth t between 60 nm and 90 nm.

A reduction in the period length d to 260 nm in other embodiments shifts the color of the diffracted light 14 with an incident light beam $B_{nTE}$ from green to red and with an incident light beam $B_{pTM}$ from red to green. The color red produced by the light beam $B_{nTE}$ changes to orange upon tilting of the security element 2 in the direction of smaller angles in the region of $\alpha$=20°.

EXAMPLE 2

Tilting-invariant Color

Another embodiment of the security element 2 exhibits an advantageous optical behaviour as, upon illumination with white unpolarised light 13, for small tilting angles, corresponding to the angle of incidence between $\alpha$=10° and $\alpha$=40°, the color of the diffracted light 14 remains practically invariant. The parameters of the waveguide 5, the layer thickness s and the profile depth t are here linked by the relationship s≈2t. For example the layer thickness s=115 nm and the profile depth t=65 nm. The period length d of the optically effective structure 9 is d=345 nm. In the specified range of the tilt angle with illumination with white unpolarised light 13 in parallel relationship with the grating lines of the optically effective structure 9 the diffracted light 14 is of a red color, to which the light beams $B_{pTM}$ primarily contribute. Upon a rotary movement of the security element 2 through a few degrees of azimuth angle the reflected color remains red while upon a further increasing rotary angle two colors are reflected symmetrically with respect to red, of which the shorter-wave color shifts in the direction of ultraviolet and the longer-wave color rapidly disappears in the infrared range. For example with an azimuth angle of 30° the shorter-wave color is an orange; the longer-wave color is invisible to the observer.

EXAMPLE 3

Color Change Upon Tilting

If the security element 2 is rotated in such a way that the incident light 13 is directed in perpendicular relationship to the grating lines, the security element 2 of Example 2, upon tilting about an axis in parallel relationship with the grating lines of the diffraction grating, exhibits a color shift: for example the observer views the surface of the security element 2 with perpendicular incidence of light, that is to say with an angle of incidence $\alpha$=0°, as an orange, with an angle of incidence $\alpha$=10° the observer sees a mixed color comprising about 67% green and 33% red and with an angle of incidence $\alpha$=30° he sees an almost spectrally pure blue.

EXAMPLE 4

Rotationally Invariant Color Change Upon Tilting

In another embodiment of the security element 2 the optically effective structure 9 comprises at least two mutually crossing diffraction gratings. The diffraction gratings advantageously cross at intersection angles in the range of between 10° and 30°. Each diffraction grating is determined for example by a profile depth t of 150 nm and a period length of d=417 nm. The layer thickness s of the waveguide 5 is s=60 nm so that the parameters s and t of the waveguide 5 satisfy the relationship t≈3s. Upon illumination with white, unpolarised incident light 13 in perpendicular relationship to the grating lines of the first diffraction grating, upon tilting about an axis parallel to the grating lines of the first diffraction grating, there is a color shift, for example from red to green or vice versa. That behaviour is maintained after a rotation through the angle of intersection as now the tilt axis is oriented in parallel relationship with the grating lines of the second diffraction grating.

EXAMPLE 5

With Asymmetrical Sawtooth Relief Profile

Figure 4:
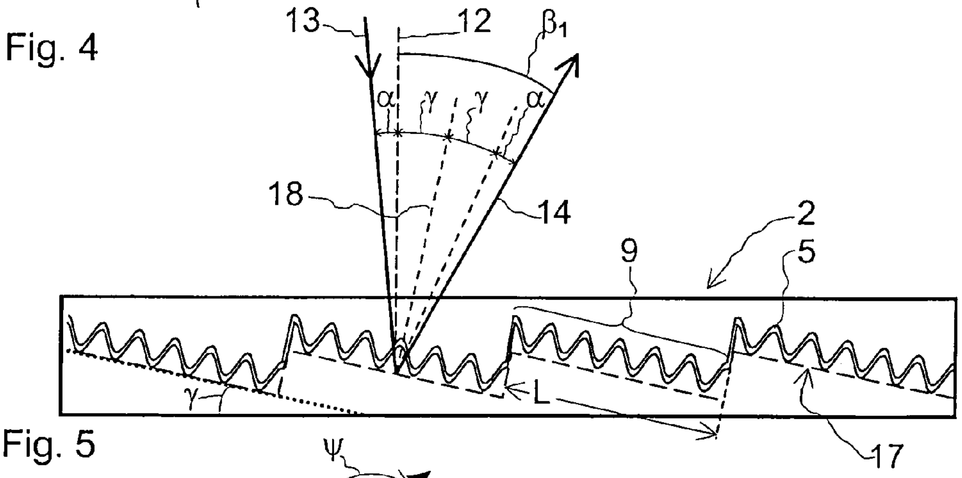
FIG. 4 shows a view in cross-section of another security element.

In the further embodiment of the security element 2 which is shown in cross-section in FIG. 4 the optically effective structure 9 is a superimposition of the zero order diffraction grating with the diffraction grating vector 19 (FIG. 5) and with an asymmetrical sawtooth-shaped relief profile 19 with a low spatial frequency of F≦200 lines/mm. That is advantageous in terms of viewing the security element 2 as, for many people, viewing the above-described security elements 2 at the reflection angle $\beta$ (FIG. 1) is very unfamiliar. The highest permissible spatial frequency F depends on the period length d (FIG. 3) of the optically effective structure 9. In accordance with the above-specified criteria for good efficiency, the length L of the waveguide 5 is within a period of the relief profile 17 of at least L=10d through 20d, preferably however L=50d through 100d. With a largest period length d=450 nm, with L=10d or 20d respectively, the spatial frequency F of the relief profile 17 is accordingly to be selected to be less than F=1/L<220 lines/mm and 110 lines/mm respectively.

In accordance with the height of the relief profile 17 or a blaze angle $\gamma$ of the sawtooth profile, upon illumination of the security element 2 by means of light 13 which is incident at the angle of incidence $\alpha$ measured with respect to the surface normal 12, the diffracted light 14 is reflected at a larger reflection angle $\beta_1$. The incident light 13 is incident at the angle $\gamma+\alpha$ relative to the perpendicular 18 on to the plane of the waveguide 5, which is inclined by virtue of the relief profile 17, and is reflected in the form of diffracted light 14 at the same angle relative to the perpendicular 18. The reflection angle $\beta_1$, related to the surface normal 12, is $\beta_1=2\gamma+\alpha$. The advantage of that arrangement is facilitated viewing of the optical effect produced by the security element 2. It is to be noted here that refraction in the materials of the layer composite 1 (FIG. 1) is disregarded in the drawing of FIG. 1. Having regard to the refraction effects in the layer composite 1 period lengths d to about d=500 nm can be used for the security element as, with that period length, even the blue components of the light 14 diffracted into the first orders, because of total reflection, cannot leave the layer composite 1 (FIG. 1). The blaze angle $\gamma$ is of a value from the range of between $\gamma=1°$ and $\gamma=15°$.

Figure 5:
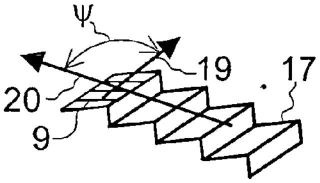
FIG. 5 shows grating vectors of an optically effective structure.

FIG. 5 shows the optically effective structure 9 which is a superimposition of the diffraction grating with an asymmetrical sawtooth-shaped relief profile 17. The azimuthal orientation of the diffraction grating is established by means of the diffraction grating vector 19 thereof. The relief structure 17 involves the azimuthal orientation specified by the relief vector 20. The optically effective structure 9 is defined by a further parameter, an azimuth difference angle $\psi$ included by the diffraction grating vector 19 and the relief vector 20. Preferred values for the azimuth difference angle are $\psi=0°$, 45°, 90° and so forth.

In quite general terms a high level of diffraction efficiency of almost 100% is typical of those security elements 2 (FIG. 3), at least for one polarisation. The most important parameter of the security element 2 for the color shift capability is the period length d (FIG. 3). The layer thickness s (FIG. 3) of the waveguide and the profile depth t (FIG. 3) are not so critical for the dielectrics ZnS and $TiO_2$ and only slightly influence the diffraction efficiency and the exact position of the color in the visible spectrum, but they influence the spectral purity of the reflected diffracted light 14 (FIG. 4).

The parameters in accordance with Table 1 can be used for those security elements 2.

The parameter period length d determines the color of the light 14 which is diffracted reflected into the zero order. A change in the parameter layer thickness s of the waveguide 5 (FIG. 4) primarily influences the spectral purity of the color of the diffracted light 14 and shifts the position of the color in the spectrum to a slight extent. The profile depth t influences the modulation of the waveguide 5 and therewith the efficiency thereof. Deviations of ±5% from the values specified in the Examples for d, s, t and $\psi$ do not noticeably influence the described optical effect, for the naked eye. That great tolerance considerably facilitates manufacture of the security element 2.

TABLE 1

| Parameter (in nanometers) | Limit value range | | Preferred range | |
|---|---|---|---|---|
| | Minimum | Maximum | Minimum | Maximum |
| Period length d | 100 | 500 | 200 | 450 |
| Profile depth t | 20 | 1000 | 50 | 500 |
| Layer thickness s | 5 | 500 | 10 | 100 |

Figure 6:
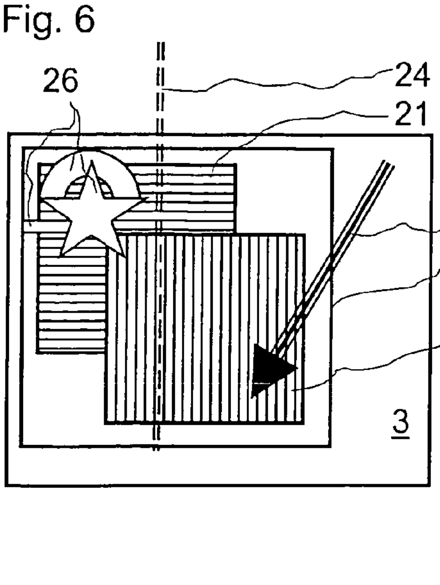
FIG. 6 shows a plan view of a security stamp or tag with the azimuth 0°.
Figure 7:
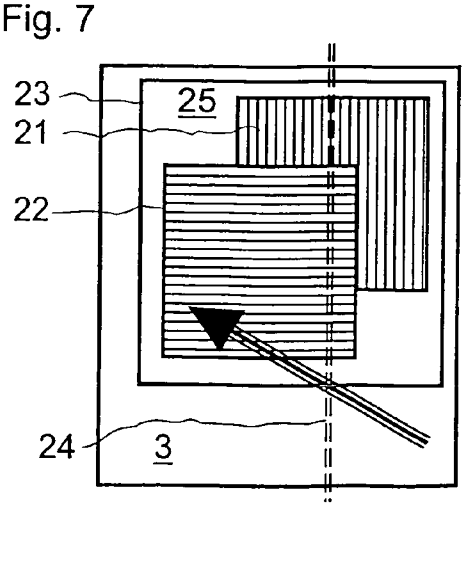
FIG. 7 shows a plan view of the security stamp or tag with the azimuth 90°.

FIGS. 6 and 7 show an embodiment of the security element 2 (FIG. 3), on the surface of which is arranged a combination of a plurality of surface portions 21, 22. The surface portions 21, 22 include waveguides 5 (FIG. 3) and differ in respect of the optically effective structure 9 (FIG. 3) and the azimuthal orientation of the diffraction grating vector 19 (FIG. 5). Differences in the layer thickness s of the waveguides 5 in the layer composite 1 (FIG. 1) are technically difficult to implement; however they are expressly not excluded here. A stamp portion or tag 23 is cut out of the layer composite 1 and stuck on to the substrate 3. In the illustrated embodiment the stamp portion or tag 23 has two surface portions 21, 22. For illustration purposes, the security element 2 of the above-described Example 1 is used here in FIG. 6, the orientation of the diffraction grating vector 19 (FIG. 5) of the first surface portion 21 being orthogonal with respect to the diffraction grating vector 19 of the second surface portion 22. The observation direction is in a plane which contains the surface normal 12 and the trace of which is specified in the plane of the drawing in FIGS. 6 and 7 by the broken line 24. For the first surface portion 21, the white unpolarised incident light 13 (FIG. 1) is incident in perpendicular relationship to the grating lines while in the case of the second surface portion 22 the incident light 13 is incident in parallel relationship with the grating lines, at the angle of incidence $\alpha=25°$. Therefore the observer sees the first surface portion 21 as a green color and the second surface portion 22 as a red color. As the layer composite 1 (FIG. 1) is transparent it is possible to recognise indicia 8 of the substrate under the stamp portion or tag 23.

After rotation of the substrate 3 with the stamp portion or tag 23 through an angle of 90°, as shown in FIG. 7, the incident light 13 (FIG. 1) is incident on the first surface portion 21 perpendicularly to the grating lines of the diffraction grating and on the second surface portion 22 parallel to the grating lines, as is indicated by the angle between hatchings of the surface portions 21, 22 and the line 24 in the drawing in FIG. 7. Rotation of the substrate 3 through 90° causes interchange of the colors of the surface portions 21, 22; that is to say the first surface portion 21 shines red and the second surface portion 22 shines green.

In another embodiment of the security element 2 the arrangement of a plurality of identical surface portions 21 on the stamp portion or tag 23 can form a circular ring, the diffraction grating vectors 19 being directed on to the center of the circular ring. With a viewing direction along a diameter of the circular ring, irrespective of the azimuthal position of the substrate 3, the most remote (0°±20°) and the closest (180°±20°) portions of the circular ring light up in a green color and the regions which are furthest away from the diameter at 90°±20° and 270°±20° respectively of the circular ring light up in a red color. Regions disposed therebetween exhibit the above-described mixed color comprising two adjacent spectral ranges. The color pattern is invariant with respect to a rotation of the substrate 3 and appears to move relative to any indicia 8 (FIG. 1). A circular ring with curved grating lines produces the same effect if the grating lines are arranged concentrically with respect to the center point of the circular ring.

In a further configuration of FIG. 7 for example the surface portions 21, 22 are arranged on a background 25. The surface portions 21 and 22 include the optically effective structure 9 (FIG. 4) from Example 5, wherein the relief vector 20 (FIG. 5) of the one surface portion 21 is in opposite relationship to the relief vector 20 of the other surface portion 22. The optically effective structure 9 of the background 25 only consists of the diffraction grating which is not modulated by the relief structure 17 (FIG. 5). The diffraction grating vector 19 can be oriented parallel or perpendicularly to the relief vectors 20; the angle $\gamma$ (FIG. 5) can certainly also be of other values.

It will be appreciated that, without limitation, all the above-described embodiments of the security elements 2 can advantageously be combined as the specific optical effects which are dependent on the azimuth or the tilt angle, by virtue of the mutual referencing thereof, are substantially more striking and can therefore be more easily recognised.

Finally other embodiments of the security element 2 also have field portions 26 (FIG. 6) with grating structures with spatial frequencies in the range of between 300 lines/mm and 1800 lines/mm and azimuth angles in the range of between 0° and 360°, which are used in the surface patterns described in above-mentioned EP 0 105 099 A1 and EP 0 375 833 A1. The field portions 26 extend over the security element 2 and over the surface portions 21, 22, 25 respectively and form one of the known optically variable patterns which changes in a predetermined manner upon rotation or tilting movement independently of the optical effects of the waveguide structures, under identical observation conditions. The advantage of that combination is that the surface patterns enhance the level of security against forgery of the security element 2.

The invention claimed is:

1. A diffractive security element having an optical waveguide comprising a transparent dielectric integrated into a layer composite and embedded between a transparent base layer to be illuminated and a protective layer, wherein the dielectric differs in refractive index from the plastic material of the adjoining layers and in surface portions bears closely against an optically effective structure of an interface in relation to the base layer, and wherein in the waveguide the transparent dielectric is of uniform layer thickness (s) and is of a value of the refractive index of at least 2, the waveguide is modulated by means of the optically effective structures and the optically effective structure as a base structure has a zero order diffraction grating with a diffraction grating vector, a period length (d) from the range of between 100 and 500 nm and a profile depth (t) from the range of between 20 nm and 1 μm, the waveguide is of a minimum length (L) of at least between 10 and 20 period lengths (d) of the zero order diffraction grating, and in at least one of the surface portions, the profile depth (t) and the layer thickness (s) for modulation of the waveguide are in a predetermined ratio of either $t \approx 3s$, $s \approx t$ or $s \approx 2t$.

2. A diffractive security element as set forth in claim 1, wherein the values of the period length (d), the profile depth (t) and the layer thickness (s) have a tolerance of ±5%.

3. A diffractive security element as set forth in claim 1, wherein the layer thickness (s) is of values from the range of between 65 nm and 85 nm and the profile depth (t) is of values from the range of between 60 nm and 90 nm and that a value from the range of between 260 nm and 370 nm is selected for the period length (d).

4. A diffractive security element as set forth in claim 1, wherein the layer thickness (s) is selected at 115 nm, the profile depth (t) at 65 nm and the period length (d) at 345 nm, all of which have a tolerance of ±5%.

5. A diffractive security element as set forth in claim 1, wherein the layer thickness (s) is of value of 60 mm, the profile depth (t) is of a value of 150 nm and the period length (d) is of a value of 417 nm, all of which have a tolerance of ±5%.

6. A diffractive security element as set forth in claim 1, wherein the base structure of the optically effective structure is a diffraction grating comprising two mutually intersecting zero order diffraction gratings.

7. A diffractive security element as set forth in claim 6, wherein the intersection angle of the zero order diffraction gratings is in the range of between 10° and 30°.

8. A diffractive security element as set forth in claim 1, wherein the optically effective structure is a superimposition of the base structure with a sawtooth-shaped relief structure with a relief vector and wherein the relief structure has a spatial frequency (F) of smaller than the inverse of the minimum length of the waveguide.

9. A diffractive security element as set forth in claim 8, wherein the sawtooth-shaped relief structure is asymmetrical with a blaze angle (γ) and the blaze angle (γ) is of a value from the range of between 1° and 15°.

10. A diffractive security element as set forth in claim 8, wherein the diffraction grating vector and the relief vector include an azimuth difference angle (ψ) with one of the values from the series 0°, 45°, 90°, 135°, 180°, 225°, 270°, 315° and 360°.

11. A diffractive security element as set forth in claim 1, wherein ZnS or $TiO_2$ is used as the dielectric of the waveguide.

12. A diffractive security element as set forth in claim 1, wherein the waveguides of the surface portions differ in the optically effective structure.

13. A diffractive security element as set forth in claim 1, wherein the waveguides of the surface portions differ with respect to the azimuthal orientation of the diffraction grating vectors.

14. A diffractive security element as set forth in claim 12, wherein the diffraction grating vector of the one surface portion is oriented orthogonally with respect to the diffraction grating vector of one of the other surface portions.

15. A diffractive security element as set forth in claim 1, wherein arranged in the surface portions are field portions with grating structures having spatial frequencies in the range of between 300 lines/mm and 1800 lines/mm and azimuth angles in the range of between 0° and 360°.

* * * * *